|     | United States Patent [19] | [11] | Patent Number: | 4,644,793 |
| --- | --- | --- | --- | --- |
|     | Church | [45] | Date of Patent: | Feb. 24, 1987 |

[54] VIBRATIONAL GYROSCOPE

[75] Inventor: Peter D. Church, Middlesex, England

[73] Assignee: The Marconi Company Limited, England

[21] Appl. No.: 770,831

[22] Filed: Aug. 29, 1985

[30] Foreign Application Priority Data

Sep. 7, 1984 [GB] United Kingdom ................ 8422699

[51] Int. Cl.$^4$ ............................................. G01C 19/56
[52] U.S. Cl. ........................................................ 73/505
[58] Field of Search .................... 73/505; 310/321, 324

[56] References Cited

U.S. PATENT DOCUMENTS

| 2,627,400 | 2/1953 | Lyman et al. | 73/505 |
| 3,182,512 | 5/1965 | Jones et al. | 73/505 |
| 3,408,872 | 11/1968 | Simmons et al. | 73/505 |
| 3,625,067 | 12/1971 | Emslie | 73/505 |
| 3,656,354 | 4/1972 | Lynch | 73/505 |

FOREIGN PATENT DOCUMENTS

| 1540279 | 2/1979 | United Kingdom | 73/505 |
| 2061502 | 10/1979 | United Kingdom . | |
| 2111209 | 12/1982 | United Kingdom . | |
| 2154739 | 2/1985 | United Kingdom . | |

OTHER PUBLICATIONS

The Marconi Review, Fourth Quarter, 1982, pp. 231–249, (Dr. R. M. Langdon).

Primary Examiner—Stephen A. Kreitman
Assistant Examiner—Scott M. Oldham
Attorney, Agent, or Firm—Kirschstein, Kirschstein, Ottinger & Israel

[57] ABSTRACT

A vibrational gyroscope is provided with a vibrating member in the form of a flexible annular shell extending from a flat flexible plate. In use, the flat plate is vibrated and excites radial vibrations in the lip of the annular shell. When the gyroscope is rotated about the shell axis, the nodes of these radial vibrations shift around the circumference of the lip, due to the action of Coriolis forces. The radial nodes of the vibrations in the plate shift similarly and their movement is detected by sensing means on the plate, giving an indication of the rotation rate.

20 Claims, 11 Drawing Figures

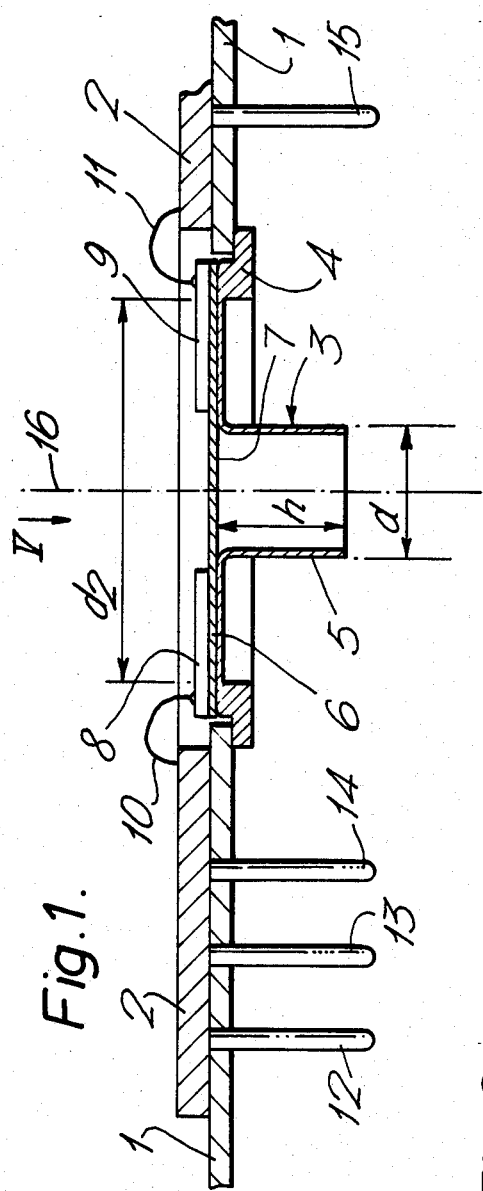
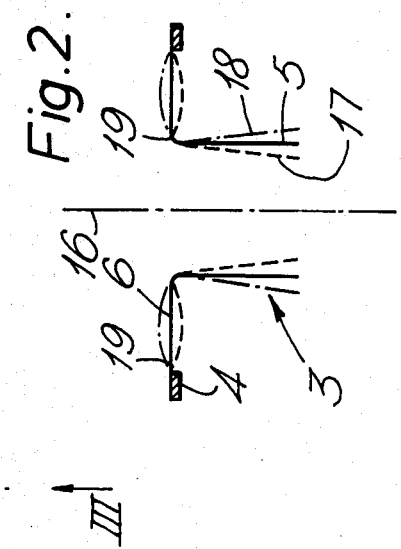
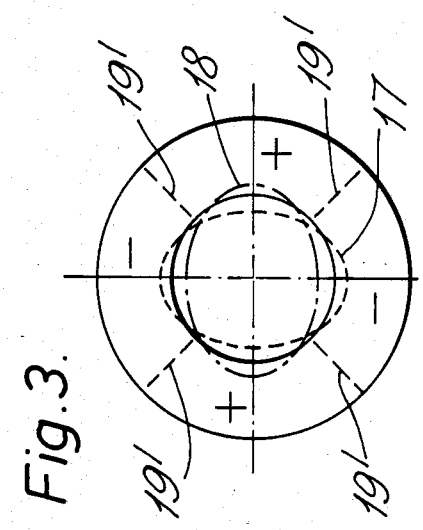

VIBRATIONAL GYROSCOPE

BACKGROUND OF THE INVENTION

1. Field of the Invention

The present invention relates to vibrational gyroscopes, that is to say rotation sensors of the type comprising a member driven to vibrate and provided with means for sensing vibrational changes resulting from the action of Coriolis forces on the vibrating member when it is rotated about a sensitive axis.

2. Description of the Related Art

Vibrational gyroscopes have many advantages over conventional gyroscopes of the spinning wheel type. Thus a vibrational gyroscope is considerably more rugged than a conventional spinning wheel gyroscope, can be started up much more quickly, consumes much less power and has no bearings which could be susceptible to wear.

A wide variety of vibrating members have been employed in previously proposed vibrational gyroscopes, ranging in shape from a tuning fork to a pair of torsionally oscillating coaxial spoked wheels. However the present invention is particularly concerned with vibrational gyroscopes in which the vibrating member comprises a radially vibrating annular shell, such as a hemispherical bell or a cylinder for example. In such gyroscopes the axis of the annular shell(say the z axis)is the sensitive axis and the shell, when vibrating, periodically distorts in an elliptical fashion with four nodes spaced regularly around the circumference and located on the x and y axes. Any rotation about the z axis generates tangential periodic Coriolis forces which tend to shift the vibrational nodes around the circumference of the shell and thereby generate some radial vibration at the original nodal positions on the x and y axes. Consequently the output of one or more transducers located at one or more of these nodal positions gives a measure of the rotation rate (relative to an inertial frame) about the z-axis.

This highly symmetrical system has a number of important advantages over arrangements in which the vibrating member is not rotationally symmetrical about the z-axis. Thus the component of vibration rotationally induced by the Coriolis forces is precisely similar to the driving vibration. Consequently if the frequency of the driving vibration changes (e.g. due to temperature variations) the frequency of the rotationally induced component of vibration will change by an identical amount. Thus if the amplitude of the driving vibration is maintained constant the amplitude of the rotationally induced component will not vary with temperature. Also the elliptical nature of the vibrational distortion ensures that the instantaneous polar moment of inertia about the z-axis is substantially constant throughout each cycle of the vibration. Consequently any oscillating torque about the z-axis (due to externally applied rotational vibration) will not couple with the vibration of the walls of the shell. Accordingly vibration gyroscopes incorporating an annular shell as the vibrating member offer superior immunity to temperature changes and external vibration.

However in practice, vibrational gyroscopes generally employ piezoelectric transducers both for driving and sensing the vibration of the vibrating member. In cases where a vibrating annular shell is employed, the transducers are mounted on the curved surface of the shell, generally near its rim. Consequently the axial symmetry of the annular shell is lost, so that the resonant frequency in the sense direction is no longer the same as the driving frequency. In order to obtain a reasonable response, this resonant frequency must be adjusted to equal the drive frequency, typically by removing material from parts of the rim of the annular shell, which is a difficult operation. Furthermore, since it is difficult to form a low compliance bond between two curved surfaces, the transducers must be sufficiently small to form an essentially flat interface with the curved surface of the annular shell. The output of the vibration-sensing transducers is limited by their strain capability, so that the sensitivity of the system is limited by signal-to-noise ratio. All these problems become more acute as the dimensions of the annular shell are reduced.

SUMMARY OF THE INVENTION

An object of the present invention is to provide a vibrational gyroscope of simple construction which is capable of a good performance even when in miniature form.

According to the present invention, a vibrational gyroscope comprises a flexible annular shell extending from a flat flexible plate, driving means for vibrating said plate so as to excite radial vibrations in said annular shell and sensing means for sensing changes in the vibration of said plate in response to changes in said radial vibrations induced by rotation about the shell axis.

Preferably said annular shell is generally cylindrical. Preferably said annular shell is generally right cylindrical.

Preferably said plate extends outside said annular shell.

Preferably said plate is annular. Said plate may be supported at a nodal point or line of a free vibrator. Alternatively the annular plate may be supported by a mounting at its edge.

The flat flexible plate may extend inside said annular shell. In such a case the flat flexible plate is preferably in the form of a disc and said annular shell is preferably supported from the disc at the centre thereof, this being a nodal point of the free vibration.

Said annular shell may extend from both sides of the flexible flat plate.

Preferably said driving means and sensing means comprise respective sets of electrodes on a common body of piezoelectric material, said body being attached to the flat plate.

Preferably the body of the piezoelectric material is an annulus or disc and is coaxial with the flexible annular shell.

Preferably the electrodes are provided with connection tabs located at a nodal region of the flat flexible plate.

Preferably said body of piezoelectric material is provided with damping electrodes for applying a damping signal to the flexible annular shell via the flexible flat plate so as to control the Q-factor of said radial vibrations.

The body of piezoelectric material may be composed of zinc oxide epitaxially deposited on the flat flexible plate. The piezoelectric material may be composed of lead zirconate titanate (P.Z.T.)bonded to the flat flexible plate. The piezoelectric material may be lithium niobate deposited by sputtering onto the flat flexible plate.

Preferably the body of piezoelectric material is mounted on the flat flexible plate in such a manner that no part of the flexible annular shell projects beyond that plate surface on which the body is mounted. This facilitates the bonding or sputtering of piezoelectric material onto the flat plate. It will be appreciated that this feature also facilitates the bonding of external connection leads to the electrodes by an automated process.

Preferably the maximum diameter of the flexible annular shell is less than 15 mm and the thickness of the flexible annular shell is less than 0.15 mm. Preferably the thickness of the flexible annular shell is less than 0.1 mm.

Preferably the vibrational gyroscope is mounted on an integrated circuit, said integrated circuit incorporating at least some of the driving or sensing circuitry associated with the driving and sensing electrodes. Preferably said integrated circuit incorporates substantially all of the required driving and sensing circuitry and is provided with input power terminals, one or more output terminals at which a signal representative of rotation of the gyroscope is generated, optionally one or more input terminals via which the sensitivity of the gyroscope can be controlled, and no other terminals.

BRIEF DESCRIPTION OF THE DRAWINGS

A number of embodiments of the invention will now be described by way of example with reference to FIGS. 1 to 10 of the accompanying drawings, of which:

FIG. 1 is a diagrammatic axial cross section of a vibrational gyroscope in accordance with the invention, FIG. 2 is a diagrammatic axial cross section illustrating the mode of vibration of the gyroscope of FIG. 1, FIG. 3 is a plan view in the direction III on FIG. 1, illustrating the same mode of vibration.

DETAILED DESCRIPTION OF THE PREFERRED EMBODIMENTS

Figure 4:
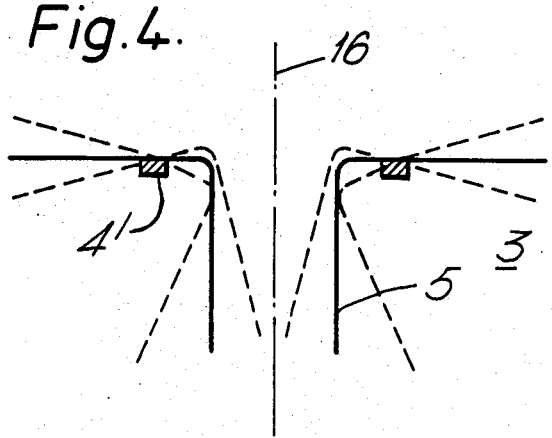
FIG. 4 is an axial cross section illustrating a vibrating member for use in a gyroscope according to the invention mounted at a nodal point of the free vibration, which mode of vibration is also shown.

Referring to FIG. 1, the vibrational gyroscope shown comprises an alumina integrated circuit substrate 1, integrated driving, sensing and controlling circuitry 2 (shown schematically) and a vibrating member 3 mounted at its thickened rim 4 in an aperture through the alumina substrate 1. Vibrating member 3 is accurately machined from low hysteresis alloy and comprises a flexible right-cylindrical shell 5 which extends from, and is integral with, a flexible annular plate 6. The wall thickness of the plate 6 and shell 5 is 0.115 mm. A lead - zirconate-titanate (P.Z.T.) ceramic disc 7 is brazed to the upper surface of flexible plate 6 and an array of gold film electrodes (only two of which, namely 8 and 9 are shown, for the sake of clarity) is deposited on ceramic disc 7. Connections are made from the electrodes to the circuitry 2 by gold wire bonds as indicated at 10 and 11 for example. The connection tabs (not shown in FIG. 1) of the electrodes 8, 9 etc. are located opposite the thickened rim 4. Since this rim is at a node of the vibrating member, the tabs and gold wire bonds are not subject to appreciable vibration. The gold wire bonds may be formed automatically with standard equipment, since the surface of disc 7 is flat and easily accessible. The integrated circuit gyroscope of FIG. 1 requires four pins only, namely an earth pin 12, a power supply pin 13, a sensitivity-control pin 14 and an output pin 15, which gives an analogue output signal proportional to the rate of rotation of the gyro-scope about the axis 16 of shell 5. In some applications sensitivity-control pin 14 may be dispensed with.

The vibrational behaviour of vibrating member 3 is illustrated in FIG. 2, which shows the two extreme positions of vibrating member 3 as dashed and chain-dotted lines 17 and 18 respectively.

FIG. 3 shows the corresponding extreme positions of the protruding end of cylindrical shell 5 in an identical manner. Referring to FIGS. 2 and 3 it will be noted that, in this edge mounted arrangement, nodes 19 form at the outer edge of plate 6 and at its intersection with cylindrical shell 5 and that four regularly spaced radial nodal lines 19' appear on plate 6. These nodal lines define two pairs of plate sections, labelled +and - respectively, which vibrate in antiphase. In use the radial vibrations shown in FIG. 3 are subjected to tangential periodic Coriolis forces when the vibrating member 3 and its mounting platform rotate about axis 16. The resultant radial vibrations are similar to those shown in FIG. 3 but with the radial nodal lines shifted circumferentially relative to the nodal positions 19'. Consequently any vibration sensor mounted at an original nodal position 19' detects plate vibrations only when the gyroscope rotates about axis 16, its output being a measure of the rotation rate. Similarly any transducer mounted on plate 6 intermediate the nodal lines 19' can be made to excite the radial vibrations indicated by elliptical lines 17 and 18 if it is set vibrating at the correct frequency.

FIG. 4 illustrates a vibrating member 3 as shown in FIG. 2, but supported by a mounting 4' positioned at a node of the free vibration. The dashed lines indicate the mode of free vibration, which is the mode that would be sustained if the member 3 were completely unrestrained. Nodal points or a nodal line of this vibration experience no displacement, so if the mounting is positioned here the gyroscope will exhibit increased resistance to extraneous vibrations.

Figure 5:
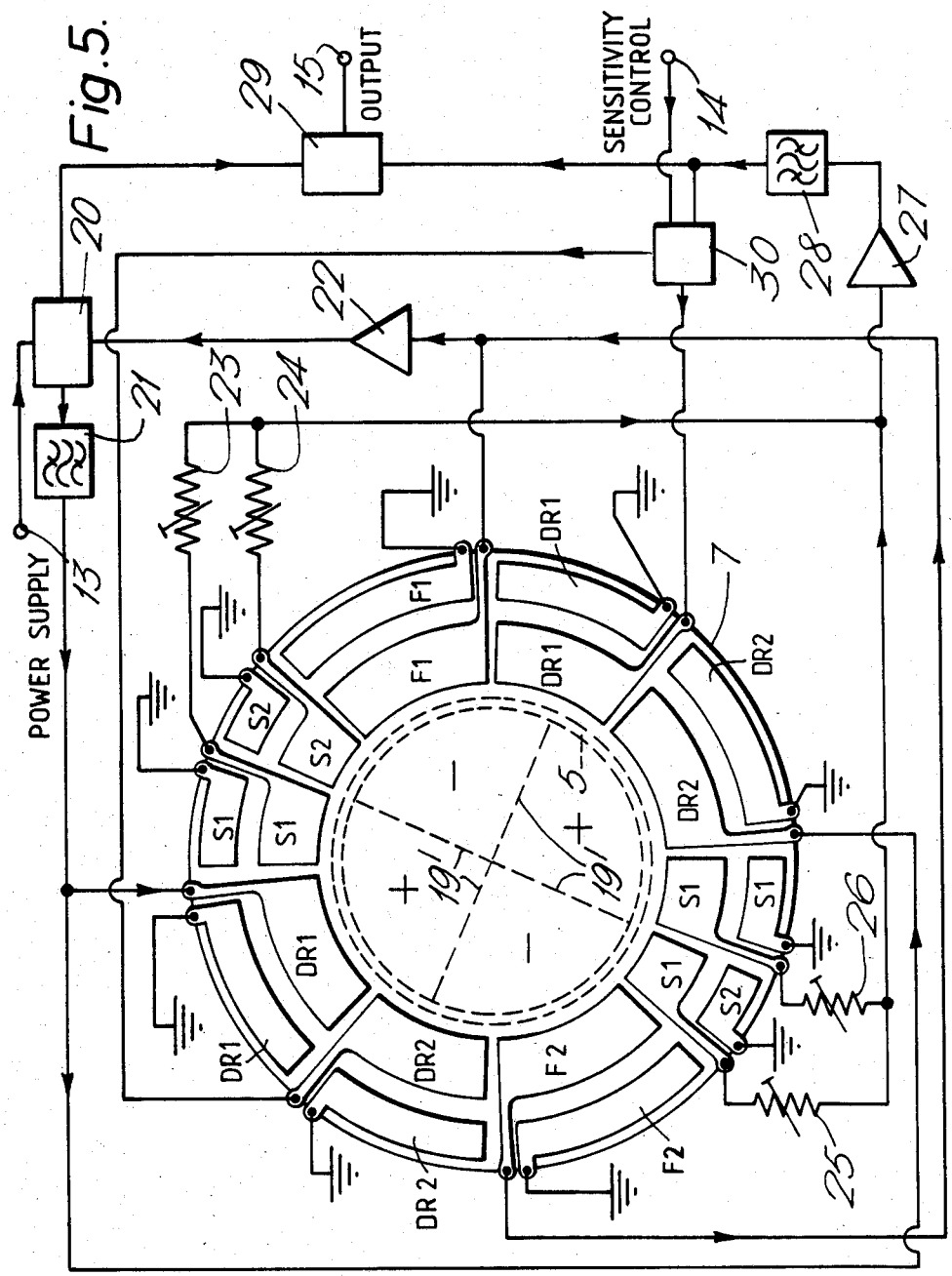
FIG. 5 is a plan view in the direction IV on FIG. 1 showing the electrode pattern and diagrammatically indicating the driving, sensing and controlling circuitry of the gyroscope of FIG. 1.

FIG. 5 illustrates the transducer arrangement and the driving, sensing and controlling circuitry of FIG. 1 which generates, controls and senses the vibrations depicted in FIGS. 2 and 3.

As shown in FIG. 1 a single flat disc 7 of P.Z.T. is bonded to flexible plate 6. This disc drives, controls and senses the vibrations of cylindrical shell 5 via gold film electrodes. Plate 6 is earthed. Two diametrically opposite drive electrodes DR 1 and DR2 are fed in parallel with an A.C. drive signal, which is maintained at the resonant frequency of plate 6 by a phaselocked loop 20, as will subsequently be described in detail. Accordingly the regions of P.Z.T.disc 7 sandwiched between electrodes DR1, DR2 are periodically compressed and expanded at the A.C. frequency and therefore expand and contract periodically in the tangential direction. This tangential expansion and contraction, being displaced from the neutral axis of plate 6, causes the sectors of plate 7 labelled — to bend in and out of the plane of FIG. 4 in antiphase with the sectors labelled -, thereby setting up radial vibrations in the lip of cylindrical shell 5 as indicated in FIGS. 2 and 3. When the gyroscope is not rotating, the radial nodes 19' are symmetrically disposed in relation to electrodes DR1 and DR2, as shown. Two diametrically opposed pairs of sense electrodes S1 and S2 are symmetrically disposed on either side of one of the stationary nodal positions 19'. These electrodes generate A.C. signals by the exact converse of the mode of operation of the driving electrodes described above. However when the gyroscope is non-rotating, the total output of electrodes S1 is substantially equal and opposite to the total output of electrodes S2. The output of each set of electrodes S1 and S2 is in any case small in the nonrotating condition, because both sets are located near one of nodes 19'. Two diametrically opposed feedback electrodes F1 and F2 are located at antinodes of vibrating disc 7 and generate feedback signals which are fed to a phase-locked loop to maintain resonance, as will subsequently be described. Two diametrically opposed damping electrodes DA1 and DA2 are fed with an A.C. damping signal of controlled amplitude and damp the vibrations shown by tending to set up vibrations at a node 19'. The sensitivity and speed of response of the system are determined by the decay time of the vibrations in vibrating member 3 - the longer the decay time (i.e. the higher the Q value), the greater the sensitivity and the longer the response time. Consequently the sensitivity or the speed of response of the system can be varied by varying the amplitude of the damping signal.

The circuitry of FIG. 5 operates as follows. An oscillator in phase-locked loop 20 generates a drive signal at a frequency of approximately 10 kHz which is filtered by a bandpass filter 21 and fed to the drive electrodes DR1 and DR2. The vibrations set up cause feedback electrodes F1 and F2 to generate a feedback signal which is amplified in amplifier 22 and fed to phase locked loop 20, which controls its oscillator frequency to maintain a 90° phase difference between the plate vibrations and the drive signal, which is the condition for resonance. The total output of sensing electrodes S1 and S2 is initially adjusted to zero for the stationary condition by suitably adjusting trimming resistors 23, 24, 25 and 26. In high stability applications the resistors may be adjusted by laser trimming. The sense electrode outputs are summed and amplified in an amplifier 27, filtered through a band-pass filter 28 and fed to a phase comparator 29. Phase comparator 29 compares the phase of the signal from phase-locked loop 20 with that of the signal from filter 28 and generates a D.C. signal whose polarity and magnitude indicates the sense and magnitude of the rotation of the gyroscope about the axis of cylinder 5. The amplified signal from filter 28 is also fed to the pairs of damping electrodes DA1 and DA2 via an electronic, variable attenuator, which is controlled via terminal 14. The earth connections shown in FIG. 5 are commoned to pin 12 (FIG. 1), not shown in FIG. 5.

It is envisaged that the disc 7 of FIG. 5 could be composed of lithium niobate or epitaxially deposited zinc oxide. The latter material has superior ageing properties to P.Z.T. but has not been used in vibrational gyroscopes because it is only weakly piezoelectric and because it can only be deposited in its piezoelectric form onto a flat surface. The large flat surface of the plate 6 makes the gyroscope of the present invention ideally suited for use with piezoelectric zinc oxide.

It will be appreciated that the vibrating member 3 may be formed in a variety of shapes within the scope of the invention. Thus the flexible annular shell may be in the form of frusto-conical shell and may incorporate an interior or an exterior flat plate. However a right cylindrical annular shell is preferred because it is relatively easy to machine. The shape and dimensions of the vibrating member should be chosen so that no unwanted modes of vibration exist at resonant frequencies close to that of the desired radial vibration.

Figure 6:
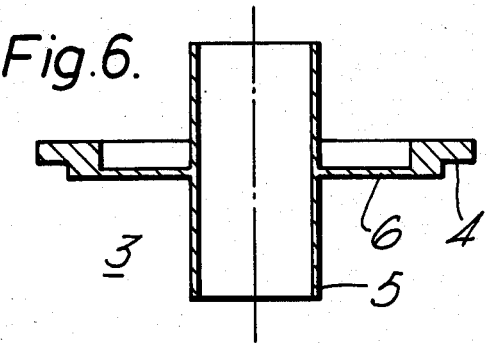
FIG. 6 is an axial cross section illustrating another vibrating member for use in the gyroscope of FIG. 1.

FIG. 6 shows a vibrating member 3 incorporating an external flat annular plate 6 with a flexible cylinder 5 extending either side of plate 6. The dimensions are similar to those of the member 3 in FIG. 1.

Figure 7:
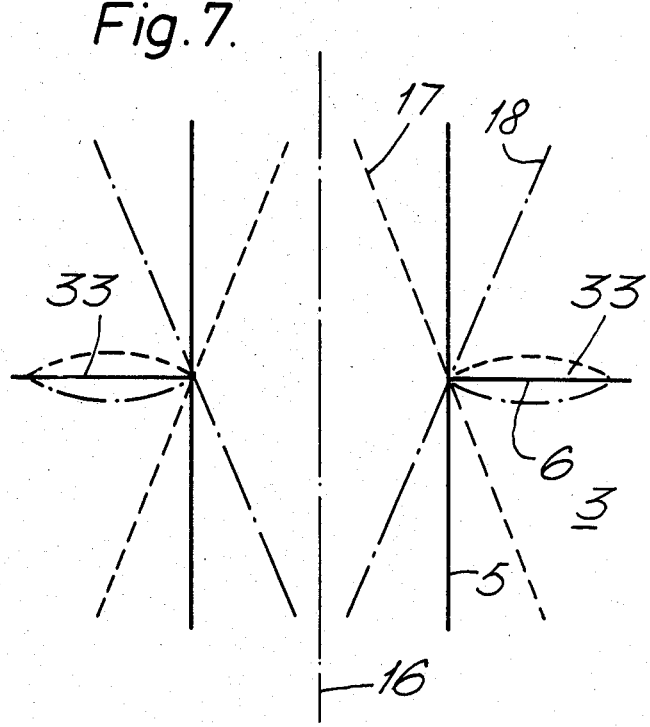
FIG. 7 is an axial cross section illustrating the mode of vibration of the vibrating member of FIG. 6.

FIG. 7 shows the corresponding modes of vibration. Points of inflection 33 exist near the edge of annular plate 6.

Figure 8:
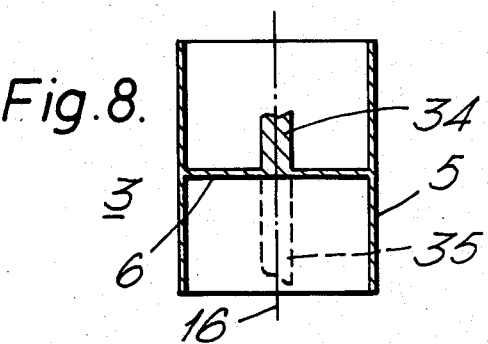
FIG. 8 is an axial cross section of another vibrating member suitable for use in the gyroscope of FIG. 1.
Figure 9:
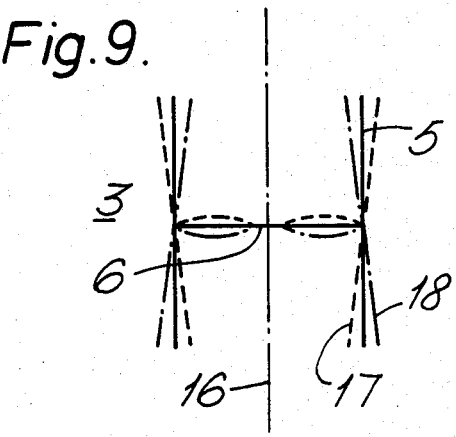
FIG. 9 is an axial cross section illustrating the mode of vibration of the vibrating member of FIG. 8.

FIG. 8 shows another possible vibrating member 3 in which an internal disc constitutes the flat plate 6. The disc is supported from a central spigot 34 (and additionally from a second spigot 35, as an alternative) and vibrates as shown in FIG. 9.

Figure 10:
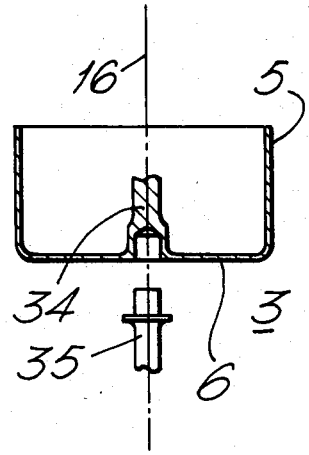
FIG. 10 is an axial cross section of a further vibrating member suitable for use in the gyroscope of FIG. 1.

FIG. 10 shows a similar construction in which one spigot 35 is fitted after the piezoelectric material (not shown) is bonded or deposited onto the outer surface of disc 6.

Figure 11:
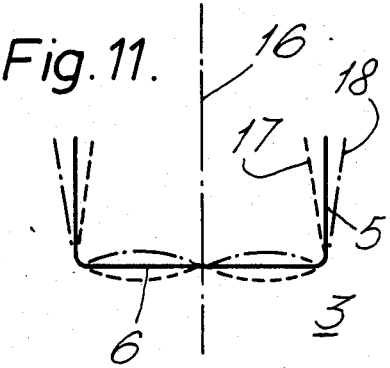
FIG. 11 is an axial cross section illustrating the mode of vibration of the vibrating member of FIG. 10.

FIG. 11 shows the mode of vibration.

Although the modes of vibration described above with reference to FIGS. 6 to 11 exhibit near zero displacements at the intersection of the annular shell and flat plate, this is not necessary for the invention. The radius of curvature of the intersection is not critical. It is envisaged that in some cases the amplitude of vibration of the shell/plate intersection may be substantial in the plane of the plate but near zero in a plane tangential to the shell.

It will be appreciated that the invention is not restricted to piezoelectrically driven vibrational gyroscopes. Thus the flat plate of the gyroscope in accordance with the invention may be driven (and its vibrations sensed) magnetically or electrostatically. Such gyroscopes are capable of high accuracy and stability, and are of simpler construction than known electrostatically and magnetically driven vibrational gyroscopes in which the driving fields are applied directly to the rim of a vibrating annular shell.

I claim:

1. A vibrational gyroscope comprising a flat flexible plate, a flexible annular shell extending from said plate, driving means for causing said plate to vibrate in such a way as to excite radial vibration in said annular shell and sensing means for sensing changes in the vibration of said plate in response to changes in said radial vibrations induced by rotation about the shell axis.

2. A vibrational gyroscope as claimed in claim 1 wherein said annular shell is substantially cylindrical.

3. A vibrational gyroscope as claimed in claim 1 wherein said annular shell is substantially right cylindrical.

4. A vibrational gyroscope as claimed in claim 1 wherein said plate extends outside said annular shell.

5. A vibrational gyroscope as claimed in claim 1 wherein said plate is annular.

6. A vibrational gyroscope as claimed in claim 5 wherein said plate is supported by a mounting at a nodal point or line of a free vibration.

7. A vibrational gyroscope as claimed in claim 1 wherein said plate is supported by a mounting at its edge.

8. A vibrational gyroscope as claimed in claim 1 wherein said plate extends inside said shell.

9. A vibrational gyroscope as claimed in claim 1 wherein said plate is a disc.

10. A vibrational gyroscope as claimed in claim 1 wherein said annular shell extends from both sides of said plate.

11. A vibrational gyroscope as claimed in claim 1 wherein said driving means and said sensing means comprise respective sets of electrodes on a common body of piezoelectric material, said body being attached to said plate.

12. A vibrational gyroscope as claimed in claim 11 wherein said electrodes are provided with connection tabs located at a nodal region of said plate.

13. A vibrational gyroscope as claimed in claim 12 wherein said body of piezoelectric material is provided with damping electrodes for applying a damping signal to said shell via said plate for controlling the Q-factor of said radial vibrations.

14. A vibrational gyroscope as claimed in claim 13 wherein said body is composed of zinc oxide epitaxially deposited on said plate.

15. A vibrational gyroscope as claimed in claim 13 wherein said body is composed of lead zirconate titanate (P.Z.T.) bonded to said plate.

16. A vibrational gyroscope as claimed in claim 13 wherein said body is composed of lithium niobate.

17. A vibrational cyroscope as claimed in claim 11 wherein no part of said shell projects beyond that surface of said plate on which said body of piezoelectric material is mounted.

18. A vibrational gyroscope as claimed in claim 17 and further comprising an integrated circuit, said vibrational gyroscope being mounted on said integrated circuit and said integrated circuit incorporating driving and sensing circuitry associated with said driving and sensing electrodes.

19. A vibrational gyroscope as claimed in claim 18 wherein said integrated circuit is provided with input power terminals and one or more output terminals at which a signal is generated representative of rotation of the gyroscope.

20. A vibrational gyroscope as claimed in claim 19 wherein said integrated circuit is provided with one or more input terminals for controlling the sensitivity of the gyroscope.

* * * * *